Aug. 20, 1935.  H. A. KNOX ET AL  2,011,583
SUSPENSION FOR VEHICLES
Filed Sept. 21, 1933  2 Sheets-Sheet 1

Inventors
Harry A. Knox
Charles Hiller, Jr.
By W. N. Roach
Attorney

Aug. 20, 1935.  H. A. KNOX ET AL  2,011,583
SUSPENSION FOR VEHICLES
Filed Sept. 21, 1933  2 Sheets-Sheet 2
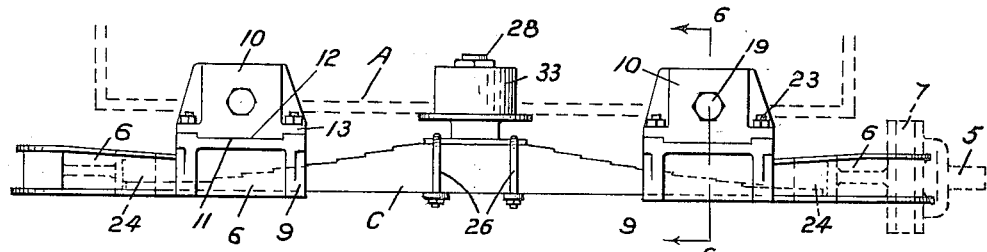
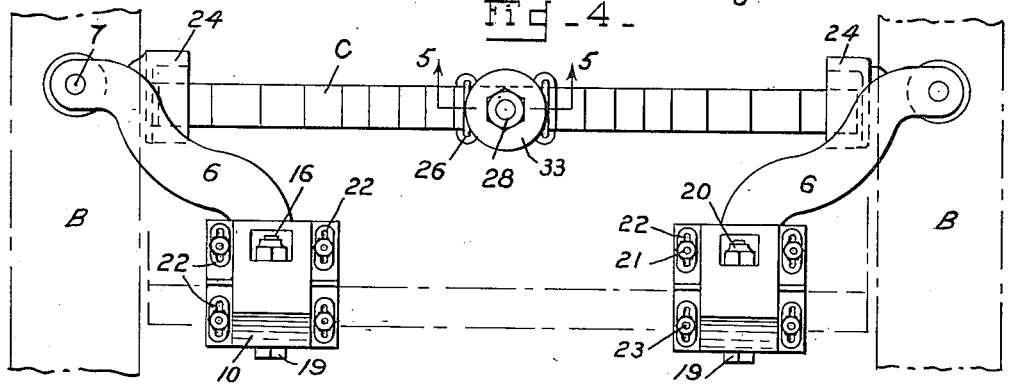
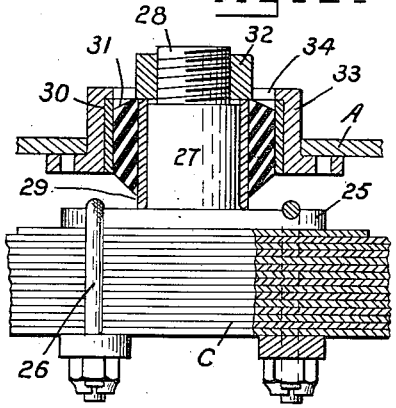
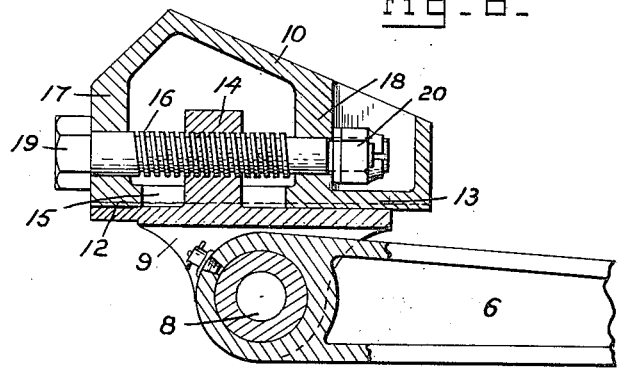
Inventors
Harry A. Knox
Charles Hiller, Jr.
By W. N. Roach
Attorney Patented Aug. 20, 1935

2,011,583

UNITED STATES PATENT OFFICE 2,011,583

SUSPENSION FOR VEHICLES

Harry A. Knox, Davenport, Iowa, and Charles Hiller, Jr., St. Louis, Mo.

Application September 21, 1933, Serial No. 690,409

1 Claim. (Cl. 267—19)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a suspension for vehicles.

The purpose of the invention is to provide a suspension in which wheels on opposite sides of a vehicle are mounted independently of each other for movement vertically in the plane of the vehicle while being under the influence of a single spring.

A further object of the invention is to provide a resilient connection between a leaf spring and the body of the vehicle.

To these and other ends, the invention consists in the construction, arrangement and combination of elements described hereinafter and pointed out in the claim forming a part of this specification.

A practical embodiment of the invention is illustrated in the accompanying drawings, wherein:

Fig. 3 is an enlarged view in front elevation of the suspension.

Fig. 4 is a plan view of Fig. 3.

Fig. 5 is a sectional view on the line 5—5 of Fig. 4.

Fig. 6 is a sectional view on the line 6—6 of Fig. 3.

Fig. 7 is a view in side elevation of one of the arms and its mounting.

Fig. 8 is a fragmentary view in front elevation showing a modified connection between the leaf spring and the vehicle body.

Figure 1:
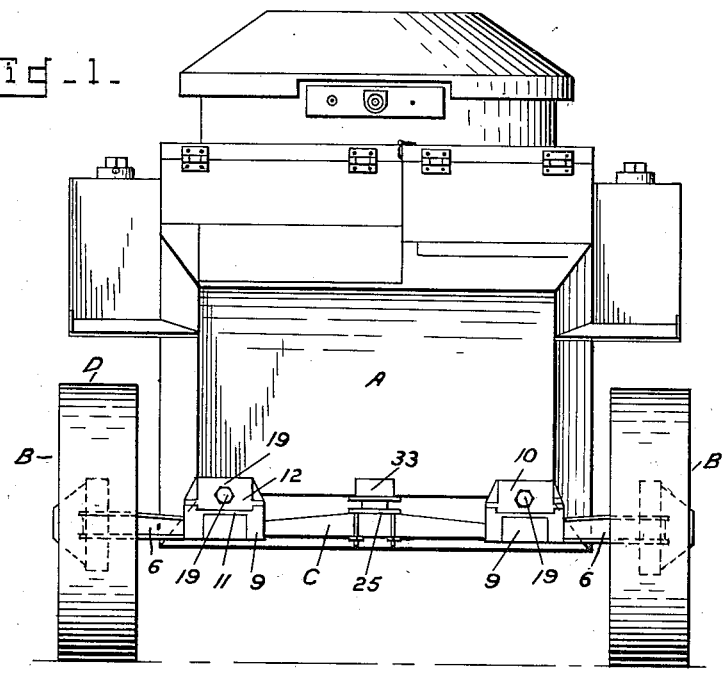
Fig. 1 is a view in front elevation of a vehicle equipped with the improved suspension.
Figure 2:
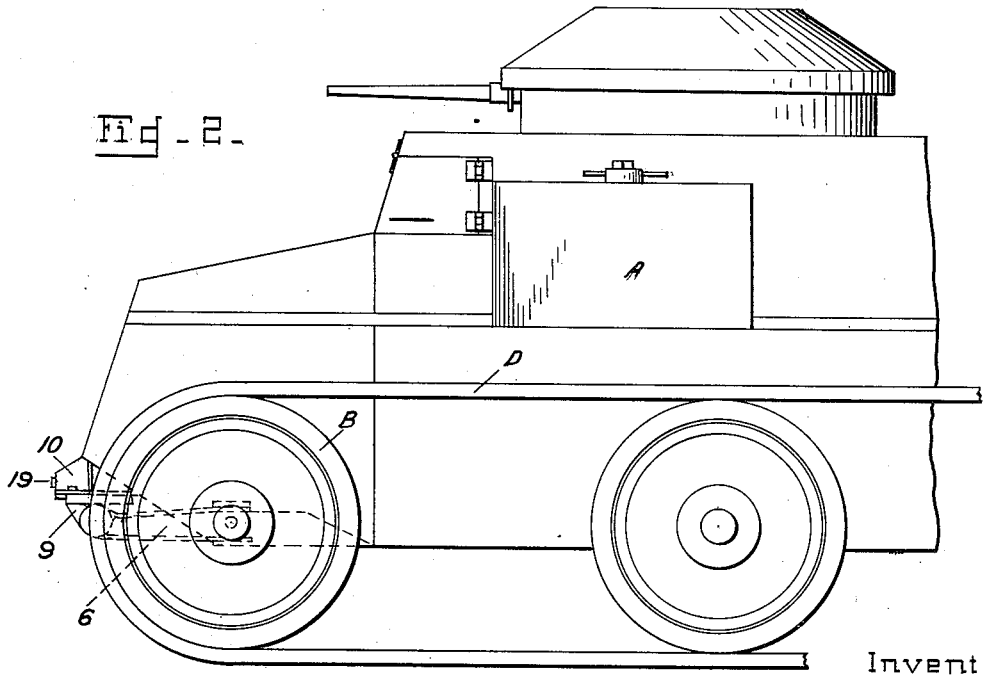
Fig. 2 is a view in side elevation of the front part of the vehicle.

Referring to Figs. 1 and 2 there is shown a vehicle whose body A constitutes a load member that is to be resiliently mounted on wheels B by means of a leaf spring C.

The wheels B which are arranged for steering are each mounted on a spindle 5 (Figs. 1 and 3) which is coupled to the free end of an arm 6 by means of a king pin 7. The arm is mounted on a pin 8 (Fig. 6) carried by a hanger 9 that is adjustably mounted on a bracket 10 fixed to the body A in any convenient manner. The upper face of the hanger is formed with a groove 11 into which is fitted a tongue 12 on the bottom plate 13 of the bracket. An upstanding lug 14 on the hanger is inserted through an aperture 15 in the bottom plate 13 and serves as a nut threadedly mounted on a bolt 16. The bolt 16 is journaled in vertical ribs 17 and 18 on the bracket and is held against longitudinal displacement by means of a head 19 on one end and a nut 20 on the other end.

Upon rotation of the bolt 16 the lug 14 is constrained to rectilinear displacement and the hanger 9 and the arm 6 carrying the wheel B are moved longitudinally of the vehicle body A. The hanger is secured in position of adjustment by means of bolts 21 which pass through the hanger and through slots 22—22 in the bracket, and which receive nuts 23. The provision for adjustment of the arm 6 is intended particularly for track-laying vehicles and permits regulation of the tension of the track D.

Each free end of the arms 6 is provided on its inner side with a socket 24 (Fig. 4) for loosely receiving an end of the leaf spring C. The socket is wider than the spring so as not to interfere with the movement of the arm during its adjustment or during its swinging movement about the pin 8.

Referring to Fig. 5 a spring seat 25 connected to the center of the spring C by the usual clip 26 is formed with an upstanding guide post 27 having a reduced threaded extremity 28. Mounted on the post is a coupling unit consisting of concentric sleeves 29—30 which are spaced by a rubber ring vulcanized to the sleeves. The inner sleeve 29 fitting on the post is held in place by means of a nut 32 on the threaded extremity 28 and the outer sleeve 30 fits in a socket member 33 which has an internal flange 34 adapted to rest on the upper edge of the sleeve 30. There is a clearance between the spring seat 25 and the lower edges of the outer sleeve and socket. The socket member 33 is fast on the body A and serves to transmit the load of the body through the rubber ring 31 and to the leaf spring C.

In the modification shown in Fig. 8 the body 36 is rigidly connected to the spring seat 37.

In operation, when a wheel encounters an obstruction or depression it is constrained by the arm 6 to move vertically in the plane of the vehicle. During its entire movement it is subject to the influence of the leaf spring C. The two wheels function independently of each other even though they are associated with a common spring. The resilient mounting of the leaf spring through the rubber ring 31 increases the flexibility of the suspension.

While in the drawings the arms 6 extend rearwardly with respect to their connection with the vehicle body they may be reversed to extend forwardly thereof without affecting the operation of the suspension.

We claim:

In a suspension for vehicles, a load member, pivotally mounted arms carried on opposite sides of the load member and independent of each other, each of said arms having a socket on the inner sides of its free end, means for moving each arm longitudinally of the load member, a wheel on the free end of each arm, a transversely extending spring connected to the load member and having opposite ends disposed in the sockets of the arms, said ends being of less width than the sockets whereby the arms are longitudinally movable independently of the spring.

HARRY A. KNOX.
CHARLES HILLER, Jr.